United States Patent
Naito

(10) Patent No.: US 6,795,299 B2
(45) Date of Patent: Sep. 21, 2004

(54) ELECTRODE FOR CAPACITOR AND CAPACITOR USING THE SAME

(75) Inventor: Kazumi Naito, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/197,262

(22) Filed: Jul. 18, 2002

(65) Prior Publication Data

US 2003/0090860 A1 May 15, 2003

Related U.S. Application Data

(60) Provisional application No. 60/306,898, filed on Jul. 23, 2001.

(30) Foreign Application Priority Data

Jul. 18, 2001 (JP) .................................... P2001-218223

(51) Int. Cl.⁷ .............................................. H01G 9/042
(52) U.S. Cl. ...................... 361/509; 361/528; 252/62.2; 29/25.03
(58) Field of Search ............................... 361/508–509, 361/516, 523–525, 528–530, 532; 29/25.03; 204/290.01, 290.12, 290 R; 252/62.2

(56) References Cited

U.S. PATENT DOCUMENTS

| | | | | |
|---|---|---|---|---|
| 5,754,394 A | * | 5/1998 | Evans et al. ................. | 361/516 |
| 6,051,044 A | * | 4/2000 | Fife ............................. | 75/229 |
| 6,200,440 B1 | * | 3/2001 | Moran et al. .......... | 204/290.01 |
| 6,351,370 B1 | * | 2/2002 | Konuma et al. ............ | 361/523 |
| 6,359,769 B1 | * | 3/2002 | Mushiake et al. .......... | 361/502 |
| 6,381,121 B1 | * | 4/2002 | Monden et al. ............. | 361/525 |

FOREIGN PATENT DOCUMENTS

| | | |
|---|---|---|
| EP | 1 158 552 A1 | 11/2001 |
| JP | 3-6808 | 1/1991 |
| JP | 4-44205 | 2/1992 |
| JP | 11-87182 | 3/1999 |
| JP | 2000-68157 | 3/2000 |
| JP | 2001-155969 | 6/2001 |
| JP | 2001-167980 | 6/2001 |

OTHER PUBLICATIONS

English translation of International Preliminary Examination Report for PCT/JP02/07304 dated Jun. 24, 2003.

* cited by examiner

*Primary Examiner*—Anthony Dinkins
(74) *Attorney, Agent, or Firm*—Sughrue Mion, PLLC

(57) ABSTRACT

An earth-acid metal is alloyed, whereby a metal foil comprising an earth-acid metal as a main component, which surface can be roughened by etching, can be obtained. An alloy of niobium with at least one element selected from Groups 3 to 16 of the periodic table is preferred. This alloy foil is etched, whereby an etched foil having an etching magnification of about 50 times or more and containing pores having an average pore size of about 0.05 to about 3 $\mu$m to the depth corresponding to at least about 5% or more of the foil thickness can be obtained. A capacitor fabricated from this etched foil as at least one part electrode and a dielectric material interposed between this one part electrode and another part electrode, is also disclosed.

22 Claims, No Drawings

ELECTRODE FOR CAPACITOR AND CAPACITOR USING THE SAME

CROSS REFERENCE TO RELATED APPLICATIONS

This application is an application filed under 35 U.S.C. §111(a) claiming benefit pursuant to 35 U.S.C. §119(e) of the filing date of the Provisional Application 60/306,898 filed Jul. 23, 2001 pursuant to 35 U.S.C. §111(b).

TECHNICAL FIELD

The present invention relates to a metal foil etched to roughen the surface (hereinafter sometimes referred to as "etched foil") and a capacitor using the etched foil.

BACKGROUND ART

Capacitors for use in electronic instruments are demanded to have a small size and a large capacitance. As one of such capacitors, a capacitor using an etched aluminum foil for one part electrode is known. In this capacitor, the electrode is etched from the surface toward the inside to a predetermined thickness and thereby enlarged in the actual surface area. As the surface area is larger, the capacitance can be larger. Therefore, etching conditions, etching method, etching agent and the like have been studied with an attempt to enlarge the surface area. With respect to the etching method, a chemical etching method and an electrical etching method are usually combined to reduce the etching pore size or increase the etching depth and thereby enlarge the surface area. However, there is a limit in enlarging the surface area while keeping various strengths of the electrode. Studies are also made to more increase the thickness of the electrode than usual and thereby attain the enlargement of surface area and the maintenance of strengths, however, this contradicts the downsizing of capacitors and cannot be a substantial improvement.

On the other hand, as a capacitor having a small size and a large capacitance, a capacitor using a sintered body of tantalum for one part electrode is known. In this capacitor, a tantalum powder is molded and then sintered and the surface area of voids among powders inside the sintered body is utilized for the capacitance of capacitor. However, in the case of a relatively large sintered body, it is difficult to impregnate another part electrode (usually, a solid compound) into the vicinity of the center of the sintered body. As a result, the appearance capacitance is disadvantageously small for the surface area. Furthermore, the distance from the outer surface to the center of the sintered body is long and therefore, if the another part electrode is the same, the capacitor using a sintered body for the electrode is inferior in the high frequency performance as compared with the capacitor using the above-described aluminum etched foil for the electrode.

Despite these problems, in the capacitor using the tantalum sintered body for one part electrode, an oxide of tantalum can be used as a dielectric material and the dielectric constant of the tantalum oxide is about three times as large as the dielectric constant of the aluminum oxide. Therefore, tantalum is an attractive material for enlarging the capacitance and many studies have been made thereon so as to solve the above-described problems.

One of such studies is an attempt to manufacture an etched foil of tantalum as an electrode material. However, desired etching is impossible or difficult on the foil of an earth-acid metal itself including tantalum. For example, tantalum dissolves in a hydrofluoric acid and therefore, a method of electrolytically oxidizing tantalum in the hydrofluoric acid to manufacture an etched foil is employed. However, in practice, only the edge part of tantalum foil dissolves and etching of the entire foil surface is failed. Studies were once made to add additives to the starting material tantalum and thereby improve the etching property, however, this could not be a remarkable technical improvement. For example, in JP-A-46-7251 (the term "JP-A" as used herein means an "unexamined published Japanese patent application"), a tantalum foil is obtained after adding a vanadium compound to tantalum or mixing a tantalum-vanadium alloy with tantalum, but the etching property is not improved.

Niobium belongs to the same group as tantalum. A niobium oxide is higher in the dielectric constant than the tantalum oxide and therefore, it is considered that by manufacturing an etched foil of niobium, a capacitor having a higher capacitance can be produced. However, this is not practiced up to the present.

DISCLOSURE OF THE INVENTION

As a result of extensive investigations to solve the above-described problems, the present inventors have found that even if desired etching is impossible or difficult on the foil of an earth-acid metal itself, an alloy foil comprising an earth-acid metal as a main component can be etched under specific conditions. The present invention has been accomplished based on this finding. The main component is a component contained in a largest proportion. A component contained in a proportion of 50% or more is a main component.

The reasons why the etching can be made are not clearly known but can be presumed because the bonding between atoms of an earth-acid metal itself becomes weak when alloyed, as a result, resistance against electro-chemical or chemical corrosion is deteriorated.

That is, the present invention relates to the following matters.

(1) A metal foil having a surface roughened by etching, wherein the metal is an alloy comprising an earth-acid metal as a main component.

(2) The metal foil as described in 1 above, wherein the earth-acid metal is niobium.

(3) The metal foil as described in 1 or 2 above, wherein the alloy comprising an earth-acid metal as a main component is an alloy with at least one element selected from the group consisting of Groups 3 to 16 by the group number of the periodic table.

(4) The metal foil as described in any one of 1 to 3 above, wherein the metal foil is partially nitrided.

(5) The metal foil as described in 4 above, wherein at least a part of the surface of the metal foil including the surface of inside pores is partially nitrided.

(6) The metal foil as described in any one of 1 to 5 above, wherein the metal foil has pores to a depth of at least 5% or more of the foil thickness in the foil thickness direction.

(7) The metal foil as described in any one of 1 to 6 above, wherein the metal foil has a surface area at least 50 times or more the surface area before etching.

(8) The metal foil as described in 6 above, wherein pores have an average pore size of 0.05 to 3 μm.

(9) The metal foil as described in any one of 1 to 8 above, wherein the concentration of impurity elements other than tantalum, niobium, oxygen, nitrogen and an alloy-forming metal element is 300 mass ppm or less.

(10) The metal foil as described in 1 to 9 above, which gives an electrostatic capacitance of at least 200 $\mu$F/cm$^2$ or more per area (projected area) not including pore areas of the metal foil, to a capacitor fabricated from the metal foil as one part electrode, a dielectric material formed on the surface of the metal foil by electrolytic oxidation at 10 V, and another part electrode provided on the dielectric material.

(11) A capacitor comprising a pair of electrodes and a dielectric material interposed between the pair of electrodes, wherein the metal foil described in any one of 1 to 10 above is used for at least one electrode.

(12) The capacitor as described in 11 above, wherein the dielectric material comprises a tantalum oxide or a niobium oxide as a main component.

(13) The capacitor as described in 11 above, wherein the dielectric material comprises a ditantalum pentoxide or a diniobium pentoxide as a main component.

(14) The capacitor as described in 12 or 13 above, wherein the dielectric material is formed by an electrolytic oxidation.

(15) A capacitor comprising a pair of electrodes and a dielectric material interposed between the pair of electrodes, wherein one part electrode is the etched foil described in 1 to 10 above and another part electrode is at least one material selected from the group consisting of electrolytic solutions, organic semiconductors and inorganic semiconductors.

(16) The capacitor as described in 15 above, wherein the dielectric material comprises a tantalum oxide or a niobium oxide as a main component.

(17) The capacitor as described in 15 above, wherein the dielectric material comprises a ditantalum pentoxide or a diniobium pentoxide as a main component.

(18) The capacitor as described in 16 or 17 above, wherein the dielectric material is formed by an electrolytic oxidation.

(19) The capacitor as described in 15 to 18 above, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquino-dimethane, and an organic semiconductor mainly comprising an electrically conducting polymer obtained by doping a dopant into a polymer containing a repeating unit represented by the following formula (1) or (2):

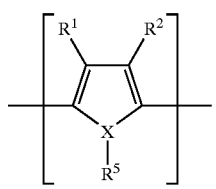

(1)

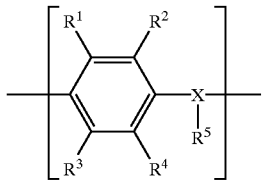

(2)

(wherein R$^1$ to R$^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a CF$_3$ group, a phenyl group and a substituted phenyl group; the hydrocarbon chains of R$^1$ and R$^2$, or R$^3$ and R$^4$ may combine with each other at an arbitrary position to form a divalent chain for forming at least one 3-, 4-, 5-, 6- or 7-membered saturated or unsaturated hydrocarbon cyclic structure together with the carbon atoms substituted by R$^1$ and R$^2$ or by R$^3$ and R$^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and R$^5$ is present only when X is a nitrogen atom, and independently represents a hydrogen atom or a linear or branched, saturated or unsaturated alkyl group having from 1 to 10 carbon atoms).

(20) The capacitor as described in 19 above, wherein the organic semiconductor is at least one member selected from the group consisting of polypyrrole, polythiophene, polyaniline and substitution derivatives thereof.

(21) The capacitor as described in 19 above, wherein the electrically conducting polymer is an electrically conducting polymer containing a repeating unit represented by the following formula (3):

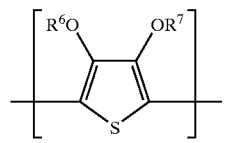

(3)

(wherein R$^6$ and R$^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted).

(22) The capacitor as described in 21 above, wherein the electrically conducting polymer is an electrically conducting polymer obtained by doping a dopant into poly(3,4-ethylenedioxythiophene).

DETAILED DESCRIPTION OF THE INVENTION

The etched foil of the present invention is an etched foil obtained by etching an alloy foil comprising an earth-acid metal as a main component and can be suitably used as an electrode of a capacitor.

The earth-acid metal includes vanadium, tantalum and niobium. In the present invention, tantalum and niobium are preferred, and niobium is more preferred. The earth-acid metal can be easily alloyed with other element by arc melting, electron beam melting or the like.

In the present invention, an alloy of an earth-acid metal with at least one element selected from the group consisting of Groups 3 to 16 by the group number of the periodic table according to the IUPAC Inorganic Chemistry Nomenclature is preferably used because the etched foil described later is particularly easy to manufacture. Among these elements, an alloy containing an element belonging to Groups 3 to 7 and Groups 13 to 16 is preferred, and an alloy containing an element belonging to Groups 3, 4, 6, 7 and 13 is more preferred.

The content of this element in an alloy varies depending on the kind of element or the objective etching depth (depth where pores are present in the foil thickness direction) or etching magnification (the ratio of surface area after etching to the surface area before etching) described later and therefore, is determined by previously performing a preliminary experiment, however, the content of the element is usually from 400 to 100,000 mass ppm. An alloy foil can be produced from the alloy by a conventionally known method such as cold rolling, hot rolling or a combination thereof. The thickness of the alloy foil is usually from about 1 to about 1,000 $\mu$m and the thickness of the etched foil produced from the alloy foil is almost the same.

In the present invention, partial nitriding of the alloy foil is effective because undesired surface oxidation before etching, which is described later, can be relieved. The nitrided amount is usually from about 10 to about 100,000 mass ppm.

The nitridation of the alloy foil can be performed by any one of liquid nitridation, ion nitridation and gas nitridation or by a combination thereof. Among these, the gas nitridation treatment by a nitrogen gas atmosphere is preferred, because the apparatus is simple and the operation is easy. For example, the gas nitridation by a nitrogen gas atmosphere is achieved by allowing the alloy foil to stand in a nitrogen atmosphere. With a nitridation atmosphere temperature of about 2,000° C. or less and a standing time of several hours, an alloy foil having an objective nitrided amount can be obtained. By performing the treatment at a high temperature, the treatment time can be shortened. The nitrided amount of the alloy foil can be controlled by the conditions of nitridation temperature and nitridation time of the material to be nitrided, which are confirmed by a preliminary test or the like.

The etched foil of the present invention can be produced by chemically or/and electrochemically etching the alloy foil. Before applying the etching, the alloy foil may be subjected to a surface treatment such as degreasing treatment or ultrasonic treatment. The chemical etching method is a method of etching the alloy foil using at least one compound selected from an acid such as nitric acid, hydrochloric acid, sulfuric acid and hydrofluoric acid, an alkali and a hydrogen peroxide. The electrochemical etching method is a method of etching the alloy foil by applying D.C. or/and A.C. thereto in an electrolytic solution. The objective etched foil of an alloy foil comprising an earth-acid metal as a main component can be produced by appropriately using those two etching methods.

In the present invention, it is effective to nitride at least a part of the etched foil surface or the etched foil surface including the surface of inside pores, because the capacitor produced as described later from the etched foil can have good performance. The nitrided amount is usually from about 10 to about 100,000 mass ppm. The nitridation can be performed by using the above-described nitridation method.

In the etched foil of the present invention, the depth of the etched pore in the foil thickness direction can be usually changed in the range from about 1 to about 40% of the foil thickness by carefully selecting the etching conditions. The etched pore depth is preferably at least about 5% or more of the foil thickness, because the capacitance per appearance surface area (capacitance per unit area measured at 120 Hz when the etched foil is chemically formed in an aqueous 0.1% phosphoric acid solution at 80° C. by applying a voltage of 10 V, hereinafter the same) increases. In this case, the etching magnification is at least about 50 times or more.

When the etched pore depth reaches about 40% of the foil thickness, the etching magnification also logarithmically increases and can be around $10^6$ times.

The average pore size (D50) of the etched foil of the present invention is usually about 10 $\mu$m or less and when the above-described A.C. etching method is used, the average pore size is from about 0.05 to about 3 $\mu$m. The pore distribution usually shows a normal distribution on a semi-logarithmic graph where the frequency and the pore size are taken on the ordinate and the abscissa, respectively, using a logarithmic scale. When the D.C. etching method and the A.C. etching method are used in combination, the pore distribution can be made not a normal distribution but, for example, a distribution having two peaks. Also, by selecting the etching conditions, the pore distribution can be made a distribution such that D10 is in the range from about 0.002 to about 0.8 $\mu$m and D90 is in the range from about 0.08 to about 20 $\mu$m.

The concentration of impurity elements contained in the etched foil of the present invention, other than the earth-acid metal, oxygen, nitrogen and an alloy-forming metal element, is about 300 mass ppm or less, preferably about 100 mass ppm or less. If the concentration of the impurity elements exceeds about 300 mass ppm, the capacitor produced from the etched foil may suffer from defective performance and this is not preferred.

The etched foil of present invention reacts with oxygen in air at room temperature and usually has an oxygen content of about 10 to about 50,000 mass ppm, though this oxygen content varies depending on the etching magnification.

By chemically forming the etched foil of the present invention using the above-described method, an oxide dielectric film can be formed on the surface thereof. When the main component of the etched foil is tantalum, the dielectric material obtained comprises a tantalum oxide as a main component. In this case, a tantalum pentoxide is the main component of the tantalum oxide. When the main component of the etched foil is niobium, the dielectric material comprises a niobium oxide as a main component. In this case, a niobium pentoxide is usually the main component of the niobium oxide, however, a niobium dioxide can made the main component according to the chemical forming conditions.

As described above, the electrostatic capacitance per apparent surface area (projected area) when the etched foil of the present invention is chemically formed at 10 V can be freely changed, however, usually, an etched foil having an electrostatic capacitance per apparent surface area of at least about 200 $\mu$F/cm$^2$ or more, preferably 400 $\mu$F/cm$^2$ or more is suitably used, because the capacitor produced from the etched foil can have a large capacitance.

Using this etched foil for at least one part electrode, a capacitor can be produced by interposing a dielectric material between this one part electrode and another part electrode. Examples of the dielectric material for the capacitor include dielectric materials comprising, as a main component, ditantalum pentoxide, diniobium pentoxide or a mixture of diniobium pentoxide and niobium dioxide. For example, a dielectric material comprising diniobium pentoxide can be obtained by chemically forming the niobium etched foil as one part electrode in an electrolytic solution. For chemically forming the niobium etched foil in an electrolytic solution, an aqueous protonic acid solution is generally used, such as an aqueous 0.1% phosphoric acid solution, an aqueous sulfuric acid solution, an aqueous organic acid solution, an aqueous adipic acid solution or an aqueous oxalic acid solution. In the case where a dielectric material comprising diniobium pentoxide is obtained by chemically forming the niobium electrode in an electrolytic solution, the capacitor of the present invention is an electrolytic capacitor.

The another part electrode of the capacitor of the present invention is not particularly limited and, for example, at least one compound selected from electrolytic solutions, organic semiconductors and inorganic semiconductors known in the art of aluminum electrolytic capacitor can be used. Specific examples of the electrolytic solution include a dimethylformamide-ethylene glycol mixed solution having dissolved therein about 5 mass % of isobutyltripropylammonium borotetrafluoride electrolyte, and a propylene carbonate-ethylene glycol mixed solution having dissolved therein about 7 mass % of tetraethylammonium borotetrafluoride. Other specific examples of the electrolytic solution which can be used include electrolytic solutions conventionally known in the art of aluminum electrolytic capacitor. In the case where an electrolytic solution is used for the another part electrode, the etched foil of the present invention or an aluminum etched foil, titanium etched foil or titanium-coated aluminum etched foil for use in aluminum electrolytic capacitors can be used as the substantial outgoing electrode.

The substantial outgoing electrode may have on the surface thereof an oxide dielectric film chemically formed at an arbitrary voltage. The chemically forming solution used in this case may be, for example, the above-described chemically forming solution or a chemically forming solution mainly comprising an ammonium salt of the compound of forming the above-described chemically forming solution.

Specific examples of the organic semiconductor which is used for the another part electrode include an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by the following formula (1) or (2):

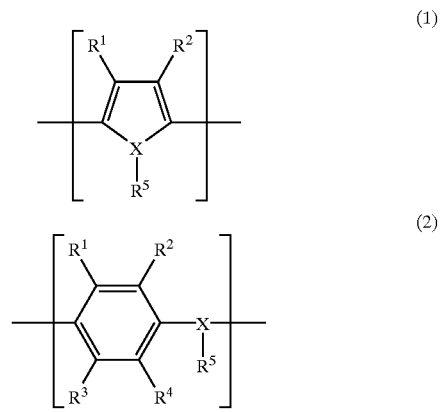

wherein $R^1$ to $R^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formula (1) or (2) each independently represents preferably a hydrogen atom or a linear or branched, saturated or unsaturated alkyl or alkoxy group having from 1 to 6 carbon atoms, and each of the pairs $R^1$ and $R^2$, and $R^3$ and $R^4$ may combine to form a ring. Examples of the polymer containing a repeating unit represented by formula (1) or (2) include polyaniline, polyoxyphenylene, polyphenylene sulfide, polythiophene, polyfuran, polypyrrole, polymethylpyrrole and derivatives of these polymers.

In the present invention, the electrically conducting polymer containing a repeating unit represented by formula (1) is preferably an electrically conducting polymer containing a structure unit represented by the following formula (3) as a repeating unit:

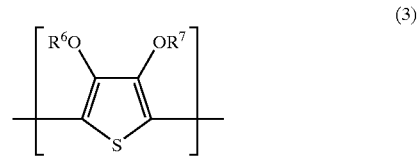

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conducting polymer containing such a chemical structure bears electrical charge and is doped with a dopant. For the dopant, known dopants can be used without limitation.

Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

When the organic or inorganic semiconductor used has an electrical conductivity of $10^{-2}$ to $10^3$ S/cm, the capacitor produced can have a smaller impedance value and can be more increased in the capacitance at a high frequency.

In using the etched foil of the present invention for at least one part electrode of a capacitor, the etched foil may be cut into a rectangular form and used in this form or in the coil form.

In the case of using the etched foil in the rectangular form, the structure of the final capacitor device may be a rectangular one-capacitor device structure where a dielectric material layer and another part electrode are stacked on the etched foil and an electrically conducting layer described later is further formed thereon, or a capacitor device structure where a plurality of one-capacitor devices are stacked and integrated.

In the case of using the etched foil in the coil form, the structure of the final capacitor device may be a capacitor device structure where the rectangular etched foil, the substantial outgoing electrode and a separately prepared paper-made or plastics-made separator are coiled together to produce a coil body and then an electrolytic solution or an organic semiconductor is introduced as another part electrode.

Furthermore, in the case where the another part electrode is solid, an electrically conducting layer may be provided thereon so as to attain good electrical contact with an exterior outgoing lead (for example, lead frame). The electrically conducting layer can be formed using, for example, solidification of an electrically conducting paste, plating, vapor deposition of metal or formation of a heat-resistant electrically conducting resin film. Preferred examples of the electrically conducting paste include silver paste, copper paste, aluminum paste, carbon paste and nickel paste. These pastes may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the another part electrode and these are molded with a material such as epoxy resin, whereby a capacitor is fabricated. In the case where the capacitor device has a coil body structure described above, an outgoing lead wire can be previously connected to the etched foil of the present invention and the another part electrode by caulking or the like. Examples of the construction material for the outgoing lead wire include tantalum, niobium and aluminum. A part of the lead wire may be plated with solder, tin or the like so as to attain good connection with an exterior substrate.

The thus-fabricated capacitor device of the present invention is jacketed using, for example, resin mold, resin case, metallic jacket case, dipping of resin or laminate film, and then used as a capacitor product for various uses. When the capacitor device has a coil body structure, the capacitor device may be housed in a can to complete a capacitor. In this case, the can is insulated from the outgoing lead wire using an insulating rubber or the like.

Best Mode for Carrying Out the Invention

The present invention is described in greater detail below by referring to Examples and Comparative Examples, however, the present invention is not limited to these Examples.

The nitrogen content of an alloy foil and an etched foil was determined using a nitrogen-oxygen analyzer manufactured by LEKO. The pore distribution of the etched foil was measured using Autopore 9200 manufactured by Shimadzu Corporation. As for the composition of the alloy foil, Si and P were determined by ICP-AES, C and S were determined by high-frequency combustion/IR, and other elements were determined by ICP-MS. The capacitance of the capacitor manufactured using the etched foil was shown by the capacitance per unit area measured at 120 Hz when the etched foil was chemically formed in an aqueous 0.1% phosphoric acid solution at 80° C. by applying a voltage of 10 V as described above.

In Examples, niobium capable of giving a larger dielectric constant is mainly described in detail. Other earth-acid metals also show the same tendency.

Manufacture of Alloy Foil

An alloy component(s) shown in Table 1 was added to niobium and then, a niobium alloy was produced by the arc melting method. A 100 mm-square small piece having a thickness of 5 mm was cut out from the alloy and an alloy foil was produced therefrom freely using the hot rolling method and the cold rolling method. The composition and thickness of each alloy foil produced are shown in Table 1. In Table 1, data of alloy foils partially nitrided by allowing alloy foils to stand at 800° C. in a nitrogen atmosphere are also shown.

TABLE 1

| Example | Composition, unit: mass ppm | | Thickness, µm |
|---|---|---|---|
| 1 | Mg | 750 | 300 |
| 2 | Y | 1200 | 360 |
| 4 | Zr | 1800 | 320 |
| 5 | Hf | 6300 | 290 |
| 6 | V | 1500 | 280 |
| 7 | Mo | 1000 | 310 |
| 8 | W | 2600 | 400 |
| 9 | Mn | 580 | 320 |
| 10 | Re | 1400 | 380 |
| 11 | Nd | 550 | 390 |
| 12 | Fe | 600 | 120 |
| 13 | Ru | 750 | 210 |
| 14 | Co | 550 | 130 |
| 15 | Ir | 800 | 180 |
| 16 | Ni | 670 | 110 |
| 17 | Pt | 590 | 360 |
| 18 | Ag | 770 | 160 |
| 19 | Zn | 600 | 90 |
| 20 | B | 1500 | 390 |
| 21 | Al | 800 | 100 |
| 22 | In | 580 | 220 |
| 23 | Si | 650 | 310 |
| 24 | Sn | 870 | 250 |
| 25 | Pb | 690 | 190 |
| 26 | Sb | 880 | 200 |
| 27 | Bi | 1500 | 330 |
| 28 | S | 620 | 190 |

TABLE 1-continued

| Example | Composition, unit: mass ppm | | | | | | Thickness, μm |
|---|---|---|---|---|---|---|---|
| 29 | Se | 770 | | | | | 250 |
| 30 | Ta | 1200 | | | | | 100 |
| 31 | Y | 520 | Ti | 510 | | | 310 |
| 32 | Zr | 630 | Fe | 440 | | | 170 |
| 33 | Hf | 740 | Ni | 480 | | | 170 |
| 34 | W | 600 | Zn | 510 | | | 200 |
| 35 | Re | 760 | Al | 880 | | | 210 |
| 36 | B | 670 | Co | 440 | | | 310 |
| 37 | Zr | 600 | B | 400 | | | 220 |
| 38 | Ra | 510 | B | 420 | Hf | 450 | 250 |
| 39 | Zr | 570 | Mn | 460 | Ta | 10000 | 180 |
| 40 | W | 480 | Mo | 440 | Ta | 24000 | 210 |
| 41 | B | 530 | N | 2300 | | | 230 |
| 42 | Zr | 610 | N | 3800 | | | 100 |
| 43 | Zr | 520 | Zn | 460 | N | 550 | 160 |

Manufacture of Etched Foil

A small piece of 30×10 mm was cut out from each of the alloy foils of Examples 1 to 40, surface-treated with hydrofluoric acid and then, subjected to A.C. etching at 80° C. in a separately prepared aqueous 5 mass % tetramethylhydroxy solution using a carbon electrode as a counter electrode at a current density of 5 mA/cm$^2$.

The alloy foils of Examples 41 to 43 were subjected to A.C. etching in the same manner as in Examples 1 to 40 except that the surface-treatment was performed using 10% calcium hydroxide in place of hydrofluoric acid.

The etched foils of Examples 40 to 43 each was an etched foil where at least a part of the etched foil surface and the surface of inside pores was nitrided by allowing the etched foil to stand in a nitrogen atmosphere at 350° C.

In the thus-produced etched foils, the concentration of impurity elements other than niobium, oxygen, nitrogen and an alloy-forming metal element(s) was 100 mass ppm or less. Various physical property values of each etched foil are shown in Table 2.

TABLE 2

| Example | D50 of Pore, μm | Pore Depth, μm | Capacitance, μF/cm$^2$ |
|---|---|---|---|
| 1 | 0.5 | 20 | 600 |
| 2 | 0.7 | 25 | 430 |
| 3 | 0.6 | 30 | 840 |
| 4 | 0.7 | 20 | 550 |
| 5 | 0.4 | 30 | 980 |
| 6 | 0.3 | 20 | 880 |
| 7 | 0.8 | 25 | 400 |
| 8 | 0.4 | 20 | 550 |
| 9 | 0.6 | 30 | 450 |
| 10 | 1.0 | 30 | 310 |
| 11 | 0.8 | 25 | 330 |
| 12 | 0.5 | 30 | 450 |
| 13 | 0.6 | 15 | 350 |
| 14 | 0.4 | 20 | 660 |
| 15 | 0.3 | 20 | 720 |
| 16 | 0.8 | 30 | 450 |
| 17 | 2.2 | 35 | 290 |
| 18 | 0.5 | 20 | 510 |
| 19 | 0.4 | 25 | 770 |
| 20 | 0.7 | 20 | 450 |
| 21 | 0.2 | 15 | 1060 |
| 22 | 0.6 | 20 | 480 |
| 23 | 1.0 | 50 | 400 |
| 24 | 0.7 | 20 | 390 |
| 25 | 0.6 | 30 | 570 |
| 26 | 0.7 | 25 | 670 |
| 27 | 0.4 | 30 | 770 |
| 28 | 0.6 | 25 | 550 |
| 29 | 0.6 | 30 | 680 |

TABLE 2-continued

| Example | D50 of Pore, μm | Pore Depth, μm | Capacitance, μF/cm$^2$ |
|---|---|---|---|
| 30 | 0.2 | 30 | 900 |
| 31 | 0.6 | 80 | 470 |
| 32 | 0.8 | 25 | 390 |
| 33 | 0.6 | 25 | 640 |
| 34 | 0.7 | 25 | 570 |
| 35 | 0.8 | 30 | 440 |
| 36 | 0.7 | 40 | 650 |
| 37 | 0.8 | 25 | 550 |
| 38 | 0.7 | 30 | 600 |
| 39 | 0.8 | 25 | 450 |
| 40 | 0.6 | 30 | 670 |
| 41 | 0.3 | 20 | 1000 |
| 42 | 0.2 | 15 | 790 |
| 43 | 0.3 | 15 | 880 |

In Example 10, the current density was adjusted to give pore depths shown in Table 3 and the capacitance with each pore depth is shown in Table 3. As seen in Table 3, when the pore depth is less than 5%, the capacitance may decrease to 200 μF/cm$^2$ or less.

TABLE 3

| Pore Depth, μm | Pore Depth, % | Capacitance, μF/cm$^2$ |
|---|---|---|
| 30 | 8 | 310 |
| 20 | 5 | 210 |
| 15 | 4 | 170 |

Manufacture of Capacitor

A plurality of small pieces of 8×3 mm were cut out from each of the etched foils produced in Examples 30 and 42 and a masking was applied to a 1×3 mm portion above a 4×3 nm portion of the small piece using an acrylic resin (the masking was applied like a headband to cover both surfaces and side surfaces of the etched foil in the 1×3 mm portion). Using the remaining 3×3 mm portion as the anode terminal and a Ta plate for the cathode, the 4×3 mm portion below the masking was chemically formed at 80° C. for 1,000 minutes by dipping it in a separately prepared aqueous 0.1% phosphoric acid solution. The oxide dielectric film formed on the surface was confirmed to comprise, as a main component, a niobium oxide comprising diniobium pentoxide. On the oxide dielectric film, a semiconductor layer shown in Table 4 was stacked and then, a carbon paste and a silver paste were stacked in this order to produce a capacitor device. A 2×3 mm portion in the anode terminal part of the produced capacitor device was cut and removed, and the remaining 1×3 mm portion above the masking was used as an anode. Four sheets of the thus-fabricated capacitor devices were stacked to align in the same direction (silver paste parts of capacitor devices were connected using a silver paste; the anode parts were stacked but not electrically connected). To two protruded parts of a separately prepared lead frame, the anode part and the silver paste part were electrically and mechanically connected using welding and silver paste, respectively. The resulting device excluding a part of the lead frame was molded with an epoxy resin to fabricate a capacitor having an outside dimension of 7.3×4.3×2.8 mm. The performances of the capacitors manufactured are shown in Table 5. The performance of a capacitor manufactured in the same manner as in Example 44 using a conventional aluminum etched foil (thickness: 100 μm, capacitance: 100 μF/cm$^2$) is shown as Comparative Example in Table 5.

TABLE 4

| Example | Etched Foil | Another Part Electrode | Method of Forming Electrode |
| --- | --- | --- | --- |
| Example 44 | etched foil produced in Example 30 | polypyrrole doped with aromatic sulfonic acid | repetition of oxidation reaction in pyrrole gas |
| Example 45 | etched foil produced in Example 30 | manganese dioxide | repetition of thermal decomposition of manganese nitrate |
| Example 46 | etched foil produced in Example 42 | polythiophene derivative doped with aromatic sulfonic acid | repetition of oxidation reaction in a thiophene derivative solution |
| Example 47 | etched foil produced in Example 42 | mixture of lead dioxide and lead sulfate (lead dioxide: 98% by mass) | repetition of oxidation reaction in an aqueous lead acetate solution |

TABLE 5 average of n = 10

| Example, Comparative Example | Capacitance 120 Hz ($\mu$F) | ESR 100 KHz ($\Omega$) | LC 4V ($\mu$A) |
| --- | --- | --- | --- |
| Example 44 | 180 | 0.03 | 3.3 |
| Example 45 | 185 | 0.1 | 2.4 |
| Example 46 | 162 | 0.03 | 3.5 |
| Example 47 | 160 | 0.03 | 2.0 |
| Comparative Example 1 | 24 | 0.08 | 0.4 |

On comparison of Examples 44 to 47 with Comparative Example 1 in Table 5, it is seen that the LC value per capacitance is from 0.01 to 0.02 $\mu$A/$\mu$F (around 0.005 CV as the CV value) and there is not so large difference, nevertheless, the capacitance of Examples is about 7 times larger than that of Comparative Example. On comparison between Example 44 and Comparative Example 1, it is seen that Example 44 has a smaller ESR and higher high-frequency performance.

Industrial Applicability

A metal foil enabling the production of a small-size and large-capacitance capacitor having good high-frequency performance, an anode using the metal foil, a capacitor using the anode and production methods of these metal foil, anode and capacitor are provided.

What is claimed is:

1. A metal foil having a surface roughened by etching, wherein the metal is an alloy comprising an earth-acid metal as a main component.

2. The metal foil as claimed in claim 1, wherein the earth-acid metal is niobium.

3. The metal foil as claimed in claim 1, wherein the alloy comprising an earth-acid metal as a main component is an alloy with at least one element selected from the group consisting of Groups 3 to 16 by the group number of the periodic table.

4. The metal foil as claimed in claim 1, wherein the metal foil is partially nitrided.

5. The metal foil as claimed in claim 4, wherein at least a part of the surface of the metal foil including the surface of inside pores is partially nitrided.

6. The metal foil as claimed in claim 1, wherein the metal foil has pores to a depth of at least about 5% or more of the foil thickness in the foil thickness direction.

7. The metal foil as claimed in claim 1, wherein the metal foil has a surface area at least about 50 times or more the surface area before etching.

8. The metal foil as claimed in claim 6, wherein pores have an average pore size of about 0.05 to about 3 $\mu$m.

9. The metal foil as claimed in claim 1, wherein the concentration of impurity elements other than tantalum, niobium, oxygen, nitrogen and an alloy-forming metal element is about 300 mass ppm or less.

10. The metal foil as claimed in claim 1, which gives an electrostatic capacitance of at least about 200 $\mu$F/cm$^2$ or more per area not including pore areas of the metal foil, to a capacitor fabricated from the metal foil as one part electrode, a dielectric material formed on the surface of said metal foil by electrolytic oxidation at 10 V, and another part electrode provided on said dielectric material.

11. A capacitor comprising a pair of electrodes and a dielectric material interposed between said pair of electrodes, wherein the metal foil claimed in any one of claims 1 to 10 is used for at least one electrode.

12. The capacitor as claimed in claim 11, wherein the dielectric material comprises a tantalum oxide or a niobium oxide as a main component.

13. The capacitor as claimed in claim 11, wherein the dielectric material comprises a ditantalum pentoxide or a diniobium pentoxide as a main component.

14. The capacitor as claimed in claim 11, wherein the dielectric material is formed by an electrolytic oxidation.

15. A capacitor comprising a pair of electrodes and a dielectric material interposed between said pair of electrodes, wherein one part electrode is the etched foil claimed in claim 1 and another part electrode is at least one material selected from the group consisting of electrolytic solutions, organic semiconductors and inorganic semiconductors.

16. The capacitor as claimed in claim 15, wherein the dielectric material comprises a tantalum oxide or a niobium oxide as a main component.

17. The capacitor as claimed in claim 15, wherein the dielectric material comprises a ditantalum pentoxide or a diniobium pentoxide as a main component.

18. The capacitor as claimed in claim 15, wherein the dielectric material is formed by an electrolytic oxidation.

19. The capacitor as claimed in claim 15, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by the following formula (1) or (2):

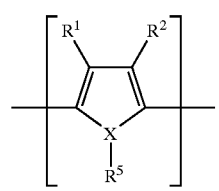

(1)

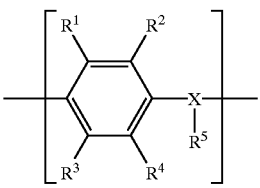

(2)

(wherein $R^1$ to $R^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms).

20. The capacitor as claimed in claim 19, wherein the organic semiconductor is at least one member selected from the group consisting of polypyrrole, polythiophene, polyaniline and substitution derivatives thereof.

21. The capacitor as claimed in claim 19, wherein the electrically conducting polymer is an electrically conducting polymer containing a repeating unit represented by the following formula (3):

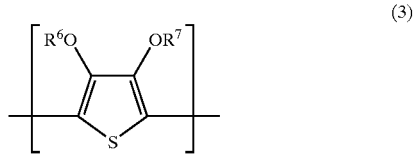

(3)

(wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted).

22. The capacitor as claimed in claim 21, wherein the electrically conducting polymer is an electrically conducting polymer obtained by doping a dopant into poly(3,4-ethylenedioxythiophene).

* * * * *